(12) United States Patent
Knaapen et al.

(10) Patent No.: US 9,854,647 B2
(45) Date of Patent: Dec. 26, 2017

(54) METHODS AND APPARATUS FOR LIGHTING CONTROL BASED ON DETECTED LIGHTING CHANGE

(71) Applicant: PHILIPS LIGHTING HOLDING B.V., Eindhoven (NL)

(72) Inventors: Bram Knaapen, Eindhoven (NL); Tim Dekker, Eindhoven (NL); Philip Steven Newton, Waalre (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/110,531

(22) PCT Filed: Dec. 31, 2014

(86) PCT No.: PCT/IB2014/067435
§ 371 (c)(1),
(2) Date: Jul. 8, 2016

(87) PCT Pub. No.: WO2015/104624
PCT Pub. Date: Jul. 16, 2015

(65) Prior Publication Data
US 2016/0338173 A1    Nov. 17, 2016

Related U.S. Application Data

(60) Provisional application No. 61/924,745, filed on Jan. 8, 2014.

(51) Int. Cl.
*H05B 37/02* (2006.01)
*H05B 33/08* (2006.01)

(52) U.S. Cl.
CPC ..... *H05B 37/0227* (2013.01); *H05B 33/0869* (2013.01); *H05B 37/0254* (2013.01); *H05B 37/0272* (2013.01)

(58) Field of Classification Search
CPC ....... G01N 21/27; G01N 21/78; G01J 3/0297; G01J 3/10; H05B 33/0869;
(Continued)

(56) References Cited

U.S. PATENT DOCUMENTS 8,198,829 B2 * 6/2012 Balasubramanian H05B 41/2825
315/185 R
8,638,036 B2 * 1/2014 Delnoij .............. H05B 37/0218
315/149
(Continued)

FOREIGN PATENT DOCUMENTS

| JP | 2002208493 A | 7/2002 |
|---|---|---|
| JP | 2012169052 A | 9/2012 |
| WO | 2013061749 A1 | 5/2013 |

*Primary Examiner* — Vibol Tan
(74) *Attorney, Agent, or Firm* — Meenakshy Chakravorty

(57) ABSTRACT

Methods, apparatus and computer-readable media for controlling a lighting unit are disclosed herein. In some embodiments, a controller may be operably coupled with one or more light sensors. The controller may, in some embodiments, be configured to receive, from the one or more light sensors, one or more signals indicative of light detected by the one or more light sensors. The controller may facilitate transition of one or more light sources of a lighting unit between first and second lighting states responsive to a determination, based on the one or more signals, that a change in a property of the light detected by the one or more light sensors satisfies a predetermined criterion, such as a threshold rate of change of the property of the detected light.

15 Claims, 6 Drawing Sheets

(58) Field of Classification Search
CPC ............ H05B 37/0227; H05B 37/0254; H05B 37/0272; H05B 41/3922
See application file for complete search history.

(56) References Cited

U.S. PATENT DOCUMENTS

| | | | | |
|---|---|---|---|---|
| 8,664,864 | B2* | 3/2014 | Salsbury | H05B 33/0869 |
| | | | | 315/152 |
| 9,345,098 | B2* | 5/2016 | Joseph | H05B 33/0869 |
| 9,456,482 | B1* | 9/2016 | Pope | H05B 33/0854 |
| 2008/0101064 | A1 | 5/2008 | Draganov et al. | |
| 2008/0129226 | A1 | 6/2008 | DeWitt et al. | |
| 2009/0267524 | A1 | 10/2009 | Draaijer et al. | |
| 2010/0090619 | A1 | 4/2010 | Adamson et al. | |
| 2010/0277106 | A1 | 11/2010 | Baaijens | |
| 2010/0328609 | A1 | 12/2010 | Silverstein et al. | |
| 2011/0133656 | A1 | 6/2011 | Balasubramanian | |
| 2011/0156596 | A1* | 6/2011 | Salsbury | H05B 33/0869 |
| | | | | 315/152 |
| 2012/0074852 | A1* | 3/2012 | Delnoij | H05B 37/0218 |
| | | | | 315/158 |
| 2013/0009553 | A1* | 1/2013 | Lee | H05B 33/0824 |
| | | | | 315/153 |
| 2013/0044395 | A1 | 2/2013 | Rodgers et al. | |
| 2013/0271157 | A1 | 10/2013 | Buttolo et al. | |
| 2014/0354150 | A1* | 12/2014 | Joseph | H05B 33/0872 |
| | | | | 315/51 |
| 2016/0198548 | A1* | 7/2016 | Monaci | H05B 37/0218 |
| | | | | 315/152 |

* cited by examiner under 35 U.S.C. §371 of International Application No. PCT/IB2014/067435, filed on Dec. 31, 2014, which claims the benefit of U.S. Provisional Patent Application No. 61/924,745, filed on Jan. 8, 2014. These applications are hereby incorporated by reference herein.

METHODS AND APPARATUS FOR LIGHTING CONTROL BASED ON DETECTED LIGHTING CHANGE

CROSS-REFERENCE TO PRIOR APPLICATIONS

This application is the U.S. National Phase application under 35 U.S.C. §371 of International Application No. PCT/IB2014/067435, filed on Dec. 31, 2014, which claims the benefit of U.S. Provisional Patent Application No. 61/924,745, filed on Jan. 8, 2014. These applications are hereby incorporated by reference herein.

TECHNICAL FIELD

The present invention is directed generally to lighting control. More particularly, various inventive methods and apparatus disclosed herein relate to transitioning one or more light sources of a lighting unit between lighting states based on a detected lighting change.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications.

Oftentimes more than one lamp is used to illuminate an environment. When building the environment from scratch, it is possible to hardwire and configure the lighting system such a way that multiple lamps may be energized in a predefined manner when a particular triggering event (e.g., flip of a light switch) occurs. However, such lighting configuration may be difficult to alter post-installation. Coded light (e.g., emitted light modulated to carry information) may be used to facilitate communication between lamps. However, coded light requires that all the lamps in the system be configured to "speak" the same language.

Accordingly, there is a need in the art for a simple solution to configure one or more lighting units to "follow" lighting patterns of various light sources, such as one or more switch-controlled lighting units in the same environment. The solution should be simple to set up in existing lighting infrastructure, and should be flexible, e.g., by avoiding requirements that the lamps be configured to communicate with each other or other devices using complex communication protocols.

SUMMARY

The present disclosure is directed to inventive methods and apparatus for transitioning one or more light sources of a lighting unit between lighting states based on a detected lighting change. For example, a lighting unit may be equipped (e.g., integrally or by way of an adaptor) with one or more light sensors (e.g., photodiodes, photoresistors, camera, etc.) that generate one or more signals indicative of light detected by the one or more signals. Based on the one or more signals, a controller may determine whether a change in a property of light (e.g., brightness, intensity, hue, saturation, etc.) detected by the one or more sensors satisfies various criteria. If so, then the controller may cause one or more light sources of a lighting unit to transition between lighting states (e.g., to energize or de-energize, or to emit lighting having one or more selected properties). For instance, a lighting unit may be configured as a "follower" such that it automatically turns on or off if it detects that a nearby lighting unit manually operated by a user is turned on or off, respectively.

Generally, in one aspect, a lighting unit may include: one or more light sources; one or more light sensors; and a controller coupled with the one or more light sources and the one or more light sensors. The controller may be configured to: receive, from the one or more light sensors, one or more signals indicative of light detected by the one or more light sensors; and transition the one or more light sources between first and second lighting states responsive to a determination, based on the one or more signals, that a change in a property of the light detected by the one or more light sensors satisfies a threshold rate of change of the property of the detected light.

In various embodiments, the signal comprises a plurality of samples of light detected by the one or more light sensors, and the change in the property of the detected light comprises a rate of change of the property of the detected light calculated based on the plurality of samples.

In various embodiments, the controller may be further configured to: cause the one or more light sensors to obtain a plurality of samples of light emitted by an outside light source as it transitions between a first state and a second state; and calculate the threshold rate of change based on the plurality of samples. In various versions, the controller may be further configured to determine a numerical approximation of a derivative of the plurality of samples to determine the threshold rate of change.

In various embodiments, the first and second lighting states comprise energized and not energized. In various embodiments, the lighting unit may further include one or more optical elements to divert the light towards at least one of the one or more light sensors. In various embodiments, at least one of the one or more light sensors is adjustable to point in a plurality of directions. In various embodiments, the controller may be further configured to transition the one or more light sources between the first and second lighting states responsive to a further determination, based on the one or more signals, that the change in the property of the light detected by the one or more light sensors follows a spatial pattern.

In various embodiments, the controller may be further configured to pause for a time interval between the determination and transitioning the one or more light sources between the first and second lighting states. In various versions, the controller may be further configured to receive a commission that assigns the lighting unit a position in a sequence of lighting units. In various versions, the controller may be further configured to calculate the time interval based on the lighting position of the lighting unit in the sequence.

In another aspect, a method may include: generating, by one or more light sensors, one or more signals indicative of light detected by one or more light sensors; receiving, by a controller from the one or more light sensors, the one or more signals; and causing transition, by the controller, of one or more light sources of a lighting unit between first and second lighting states responsive to a determination, based on the one or more signals, that a change in a property of the light detected by the light sensor satisfies a predetermined criterion.

In various embodiments, the predetermined criterion comprises a spatial pattern. In various embodiments, the method further comprises causing transition, by the lighting unit controller, of the one or more light sources between the first and second lighting states responsive to a further determination, based on the one or more signals, that the change in the property of the light detected by the one or more light sensors follows the spatial pattern.

In various embodiments, the predetermined criterion comprises a minimum rate of change. In various versions, the one or more signals comprises a plurality of samples of light detected by the one or more light sensors, and the change in the property of the detected light comprises a rate of change of the property of the detected light calculated based on the plurality of samples. In various versions, the method may further include: obtaining, by the one or more light sensors, a plurality of samples of light emitted by an outside light source as it transitions between a first state and a second state; and calculating, by the controller, the minimum rate of change based on the plurality of samples. In various versions, the method may further comprise determining a numerical approximation of a derivative of the plurality of samples to determine the threshold rate of change. In various embodiments, the first and second lighting states comprise energized and not energized.

In another aspect, a lighting unit may include: one or more light sources; one or more light sensors; and a controller coupled with the one or more light sources and the one or more light sensors. The controller may be configured to: determine a time interval based on a designated position of the lighting unit in a sequence of lighting units; receive, from the one or more light sensors, one or more signals indicative of light detected by the one or more light sensors; determine, based on the one or more signals, that a change in a property of the light sensed by the one or more light sensors satisfies a threshold rate of change of the property of the detected light; and responsive to the determination and after a pause for the time interval, transition the one or more light sources between first and second lighting states.

In another aspect, a lighting unit adaptor may include: one or more light sensors; and a controller coupled with the one or more light sensors. The controller may be configured to: receive, from the one or more light sensors, one or more signals indicative of light detected by the one or more light sensors; and cause transition of one or more light sources of a lighting unit between first and second lighting states responsive to a determination, based on the one or more signals, that a change in a property of the light detected by the one or more light sensors satisfies a threshold rate of change of the property of the detected light.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 500 nanometers to approximately 700 nanometers).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps) etc.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

More than one lighting unit may be deployed to illuminate an environment. However, preinstalled lighting systems may be difficult to alter post-installation, particularly when hard-wired to a particular configuration. Various communication techniques may be implemented to facilitate communication between lamps, but these techniques may be complex and/or cumbersome to configure. Accordingly, Applicants have recognized and appreciated that it would be beneficial to provide a simple solution to configure one or more lighting units to "follow" lighting patterns of various light sources, such as one or more switch-controlled lighting units in the same environment. In view of the foregoing, various embodiments and implementations of the present invention are directed to transitioning one or more light sources of a lighting unit between lighting states based on a detected lighting change.

Figure 1:
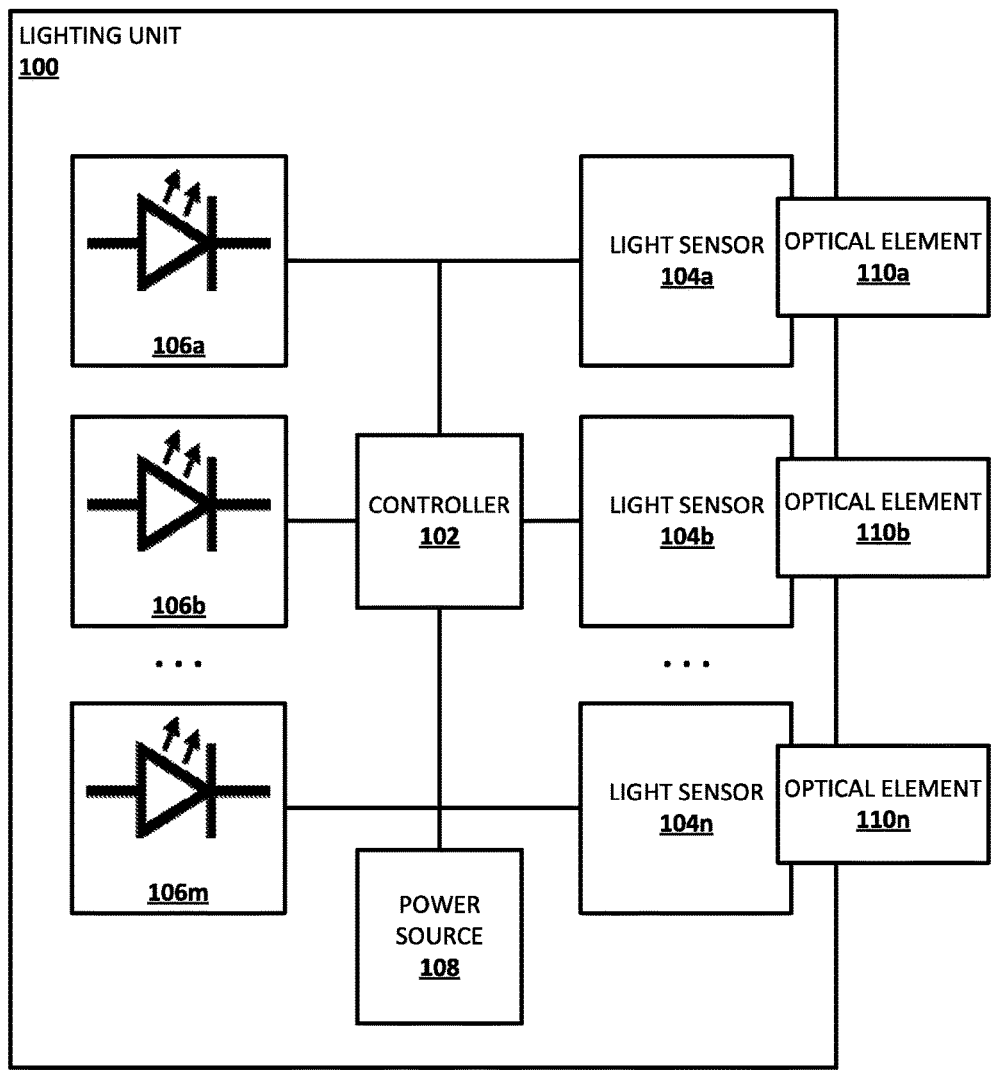
FIG. 1 schematically depicts an example lighting unit, in accordance with various embodiments.

Referring to FIG. 1, in one embodiment, a lighting unit 100 may include a controller 102. Controller 102 may be operably coupled with one or more light sensors 104a-n (referenced generically by 104) and one or more light sources, such as one or more LEDs 106a-m (referenced generically by 106) depicted in FIG. 1. In various embodiments, controller 102 may also be operably coupled with a power source 108. Power source 108 may take various forms, including but not limited to a battery or an interface to an outside source of power, such as AC mains.

In various embodiments, lighting unit 100 may be configured to act as a "follower" lighting unit that bases its own lighting behavior off of one or more observed sources of light (hereinafter sometimes referred to as "followed" light sources or "followed" lighting units), such as natural light or another lighting unit in an environment. In some cases, lighting unit 100 may be configured to turn on or off when a followed lighting unit, typically controlled by a switch, turns on or off, respectively. Thus, the follower lighting unit 100 does not need to be operably coupled with the switch that controls the followed lighting unit to behave in the same or a similar manner.

In some embodiments, controller 102 may be configured to receive, e.g., from one or more light sensors 104a-n, one or more signals indicative of light detected by one or more light sensors 104a-n. For instance, one or more light sensors 104 may include photodetectors such as photodiodes, photovoltaic cells, photoresistors, phototubes, phototransistors, color light sensors, and so forth, and may be configured to generate a signal indicative of detected light. In some embodiments, color light sensors may be configured to distinguish outside light from light emitted by an artificial light source such as an incandescent bulb or LED, e.g., by detecting various color components of light. LEDs, for instance, have different color spectrums than daylight.

Based on these signals, controller 102 may be configured to determine that a change in a property of the light (e.g., brightness, intensity, hue, saturation, balance, etc.) detected by one or more light sensors 104 satisfies a predetermined criterion such as a threshold rate of change of the property of the detected light. Upon determining that the predetermined criterion is satisfied, controller 102 may transition, or may cause transition of, one or more light sources 106 between first and second lighting states.

For instance, assume the predetermined criterion is a minimum rate of change. The minimum rate of change may be selected so that controller 102 transitions light sources 106 to an on (or off) state when a nearby light is turned on (or off), but not when other, less dramatic lighting transition are detected (e.g., a cloud passing over the sun, sun rising or setting, curtain passing over window).

In some embodiments, the minimum rate of change may be determined based on light output of a followed light source. For example, controller 102 may be configured to cause one or more light sensors 104 to obtain a plurality of samples of light emitted by a followed light source as the followed light source transitions between a first state (e.g., off/not energized) and a second state (e.g., on/energized). Controller 102 may then calculate the minimum rate of change based on the plurality of samples. For example, controller 102 may determine a numerical approximation of a derivative of the plurality of samples to determine the minimum rate of change (which may or may not be in the form of a function). In this manner, controller 102 may determine and utilize one minimum rate of change when configured to follow a relatively fast-transitioning light source such as an LED-based light source, and may determine and utilize another minimum rate of change when configured to follow a slower-transitioning light source such as an incandescent bulb.

Later, when one or more light sensors 104 detect a change in a property of light emitted by a nearby light source, one or more light sensors 104 may produce a signal that includes a plurality of samples of light, e.g., detected at a particular sampling rate. Based on this plurality of samples, controller 102 may calculate a rate of change of the property of the light detected by one or more light sensors 104. For example, and similar to calculating the minimum rate of change as described above, controller 102 may determine a numerical approximation of a derivative of the plurality of samples to determine an estimated function formed by the plurality of samples. Controller 102 may then calculate a rate of change function by calculating a derivative of the estimated function. This rate of change function may then be compared to the minimum rate of change function described above. Comparing derivative functions in this manner enables controller 102 to handle situations where the property of light emitted by the followed light source changes linearly or non-linearly.

In addition to or instead of a minimum rate of change, other criteria may be used to determine when to transition one or more light sources between lighting states. As a non-limiting example, in embodiments where light sensor 104 is a color light sensor, controller 102 may monitor a signal from the color light sensor to determine whether one or more color components of detected light changes in a way that is consistent with an artificial source of light being turned on or off, as opposed to in a way that is consistent with a change in natural light.

In various embodiments, lighting unit 100 may include one or more optical elements 110a-n to divert light towards at least one of one or more light sensors 104a-n or otherwise affect light from a followed light source. Optical elements 110a-n may come in various forms, including but not limited to lenses (e.g., diffusing, magnifying, etc.), collimators, and so forth. In some embodiments, one or more optical elements 110 may be adjustable, e.g., by controller 102 or by hand, to divert light from various selected directions towards one or more light sensors 104. In some embodiments, one or more light sensors 104 may itself be adjustable to point in a plurality of directions. For instance, the light sensor 104 may be mounted on a flexible member such as a wire or stick that is configured to be bent and/or oriented in various directions. In some embodiments, one or more optical elements 110 may include a mask that is adjustable to make a light sensor 104 blind in particular directions.

Once lighting unit 100 is installed, it is possible that a direction from which triggering light change is detected may not often change. In such a scenario, a user may prefer that lighting unit 100 only follow a particular source of light, and not react to other extraneous and/or temporary light sources (e.g., flashlights, camera flashes, etc.). Assuming one or more light sensors 104 are placed on lighting unit 100 so that they face different directions, in some embodiments, controller 102 may be configured to determine, based on one or more signals from one or more light sensors 104, that the change in the property of the light detected by one or more light sensors 104 follows a spatial pattern. For example, in some embodiments, controller 102 may only transition light sources 106 between lighting states in response to signals from certain light sensors 104 that face a certain direction. In some embodiments, and as will be described in further detail below, lighting unit 100 may be one of a plurality of lighting units that are configured to turn on or off in sequence (e.g., for aesthetic appeal). In such case, controller 102 may transition light sources 106 on or off after light sensors 104 detect that a particular pattern of other lighting units have turned on or off, and may not react or react differently if a different pattern is detected.

Another property of light emitted by a followed light source to which a controller 102 may react is a transition between discrete levels of the property. For instance, assume a followed light source is configured to transition between x discrete intensity levels. Controller 102 may, based on one or more signals from one or more light sensors 104, determine when light emitted by the followed light source has transitioned to a different intensity level, and may react accordingly (e.g., by energizing or de-energizing one or more light sources 106). Or, if the followed light transitions to emitting light of a different color, controller 102 may energize or de-energize one or more light sources 106, or may even adjust a color of light emitted by one or more light sources 106.

In some embodiments, controller 102 may transition one or more light sources 106 between various lighting states based on a dynamic predetermined criterion. For instance, human beings may be very sensitive to lighting changes in low-light situations, but less sensitive to lighting changes in situations with more light. Lighting unit 100 may be configured with a dynamic lighting intensity profile that attempts to track humans' sensitivity to light. This dynamic lighting intensity profile may cause controller 102 to be more (or less) sensitive to lighting changes in settings in which light is already at low intensity, and thus more (or less) likely to react by transitioning one or more light sources between lighting states. On the other hand, this dynamic lighting intensity profile may cause controller 102 to be less (or more) sensitive to lighting intensity changes in settings in which light is already at a relatively high intensity, and thus less (or more) likely to react by transitioning one or more light sources between lighting states. For example, a lighting unit may react more readily to a minor change in light emitted by another nearby lighting unit when the overall lighting is dim, whereas the same lighting unit may be less prone to react to a major change in light emitted by the other nearby lighting unit when the overall lighting is bright.

Figure 2:
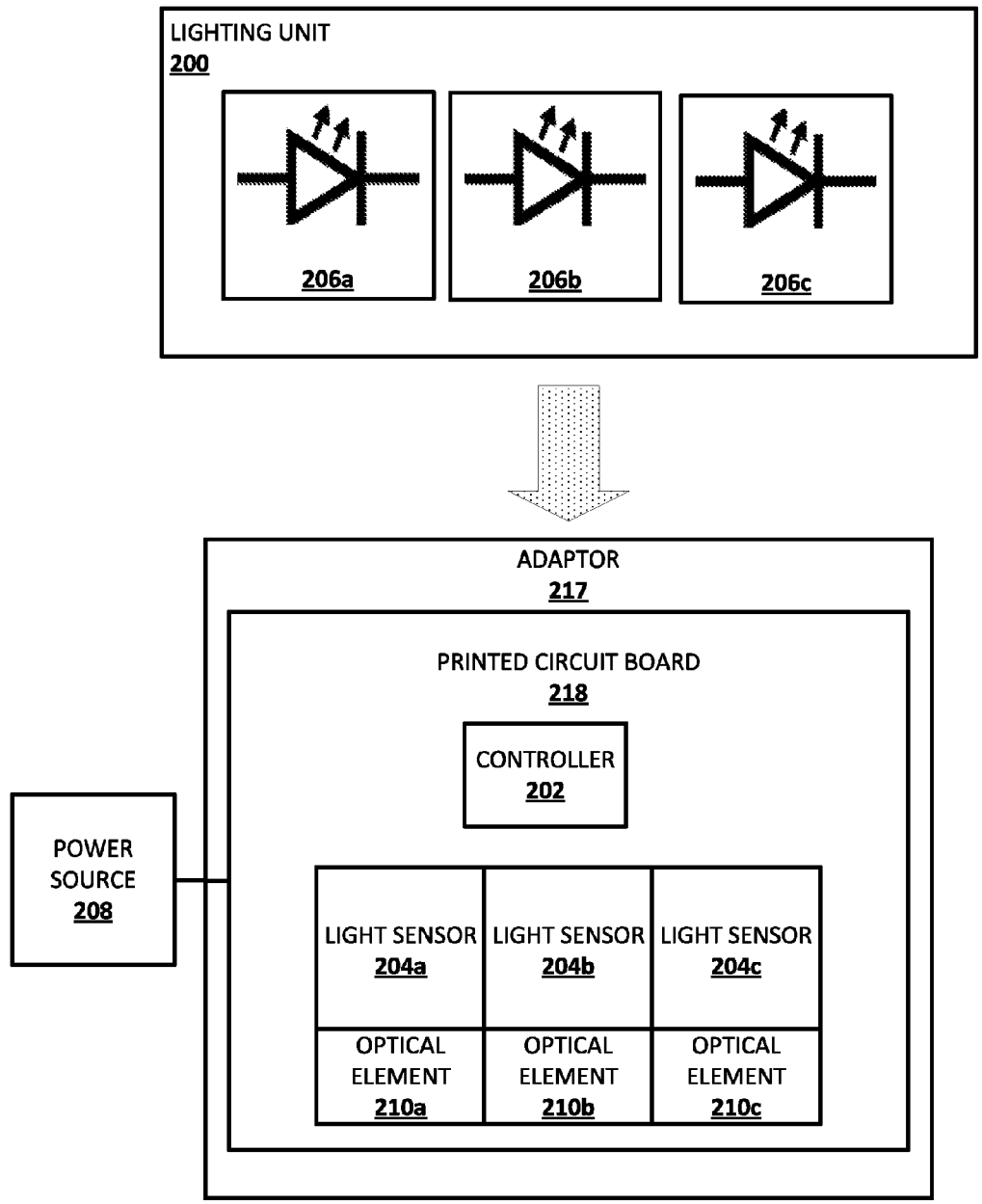
FIG. 2 schematically depicts an alternative embodiment in which a conventional lighting unit is retrofitted with an adaptor configured to practice selected aspects of the present disclosure, in accordance with various embodiments.

FIG. 2 depicts an alternative embodiment in which the components described in FIG. 1 are not all integrated into a lighting unit. Instead, lighting unit 200 may be a conventional lighting unit that includes one or more light sources, such as a LEDs 206a-c. Controller 202 may be integral with a separate adaptor 217. In some embodiments, adaptor 217 may be connectable with power source 208 (e.g., by being inserted into a light socket that is connected to AC mains). Lighting unit 200 may be installed into/onto adaptor 217 as indicated by the arrow. In this manner, conventional lighting fixtures may be retrofitted with adaptors 217 so that those fixtures and their installed lighting units 200 may be operated as described herein. In some embodiments, adaptor 217 may include one or more printed circuit boards 218 used to mount and/or operably couple various components, such as controller 202, light sensors 204a-c and optical elements 210a-c. Three light sensors 204, light sources 206 and optical elements 210 are depicted in FIG. 2. However, this is not meant to be limiting, and more or less of each component may be included. Throughout the remainder of this disclosure, any reference to a lighting unit, even if followed by reference numeral 100, may refer to either an integrated lighting unit, such as lighting unit 100 in FIG. 1, or a retrofit lighting unit, such as adaptor 217 in FIG. 2 with conventional lighting unit 200 installed.

Referring back to FIG. 1, in another aspect, lighting unit 100 may be one of a plurality of lighting units configured to transition between lighting states (e.g., turn on or off) in sequence in response to a triggering event (e.g., flipping on a light switch, detection by a presence detector, receipt of a command from a smart phone or tablet computer, etc.). For instance, assume all lights in a large auditorium are turned off. When a person enters the auditorium and turns on the lights (e.g., hits a switch at the door or operates a lighting control application executing on her smart phone), it may not be aesthetically pleasing to have all the lights turn on simultaneously. Moreover, such an abrupt transition from no light to all lights on, or vice versa, may not be optimal for the user's vision. For instance, if all lights turn on or off simultaneously, the user may be prone to temporary blindness until her eyes adjust.

Accordingly, in various embodiments, lighting unit 100 may be configured to pause for a time interval between determining that a change in a property of detected light satisfies a predetermined criterion and actually implementing the responsive transition. This time interval may hereinafter be referred to as the "pause time interval." In various embodiments, controller 102 may be configured to calculate the pause time interval based on a position of lighting unit 102 in a sequence of lighting units configured to act together to power up or down in an aesthetically pleasing manner.

In some embodiments, lighting unit 100 may be preprogrammed, e.g., by the manufacturer, with its position in a sequence of lighting units. Some such lighting units may have the sequence number printed or otherwise affixed on an exterior surface of the lighting unit to aid in installation. In other embodiments, lighting unit 100 may be commissioned by an outside device to be part of a logical group of lighting units. For instance, a commissioning device such as a portable computing device (e.g., smart phone, tablet computer) or an autonomous commissioning robot may, upon coming into proximity with lighting unit 100, inform lighting unit 100, e.g., using various communication technologies (e.g., WiFi, Bluetooth, coded light, RFID, NFC, etc.), of lighting unit's 100 position in a sequence of lighting units. In some embodiments, controller 102 may be configured to calculate, based on the lighting position of lighting unit 100 in the sequence, the pause time interval. In some embodiments, instead of the pause time interval being calculated by controller 102, it may be more directly programmed in memory accessible to controller 102 during manufacture or by a commissioning device. In yet other embodiments, each lighting unit 100 may include a user interface, e.g., in the form of a dipswitch or other inputs, that a user may operate to specify the lighting unit's position in a sequence and/or its pause time interval.

In some embodiments, lighting units of a group may be transitioned into a "learning mode" in which they automatically determine their positions within a sequence and/or pause time intervals based on various cues. For instance, a group of lighting units in learning mode may be touched or otherwise operated by a user in a particular order to indicate a position of each lighting unit in the sequence. As another example, a group of lighting units in learning mode may detect one or more properties of light (e.g., using light sensors 104) and may select respective positions in the sequence based on the one or more properties of the detected light.

In some embodiments, there may be a similar time interval between each lighting unit transitioning its respective light sources between lighting states. To implement this so that the lighting units appear to transition between lighting states in a cascade, a lighting unit may multiply its pause time interval by its position within the sequence. In other embodiments, lighting units may be configured so that varying time intervals elapse between the lighting units transitioning their respective light sources between lighting states. For example, in some embodiments, the time intervals may increase or decrease as the sequence of lighting units progressively energize or de-energize their respective light sources, to provide the illusion that the lights are "speeding up" or "slowing down."

Figure 3:
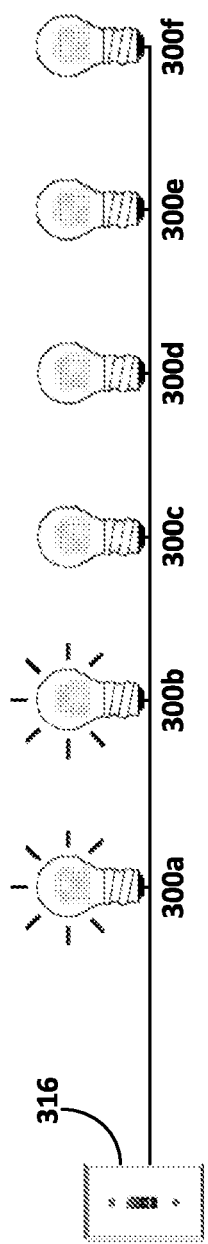
FIG. 3 schematically depicts an example group of lighting units, in accordance with various embodiments.

Lighting unit 100 may be configured to operate as one of a sequence of lighting units in ways other than by detecting changes in light and pausing before reacting. For instance, and referring to FIG. 3, a plurality of lighting units 300*a-f* are all connected to the same power switch 316. In such embodiments, each lighting unit 300 may be configured with its pause time interval or its position in the sequence (from which it may calculate its pause time interval). Upon the plurality of lighting units 300*a-f* receiving power (which practically speaking would happen virtually simultaneously), each lighting unit 200 may wait for its pause time interval before it turns on.

Figure 4:
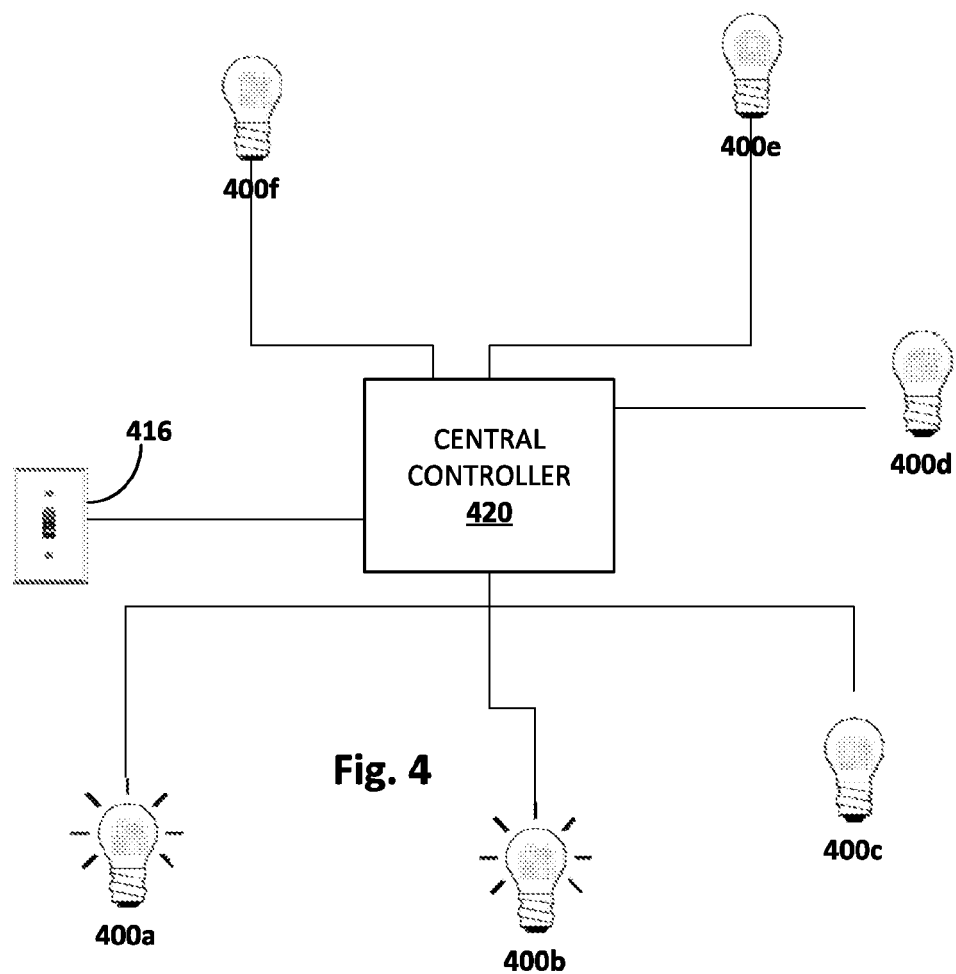
FIG. 4 schematically depicts another example group of lighting units, in accordance with various embodiments.

FIG. 4 depicts an alternative embodiment where a plurality of lighting units 400*a-f* are in communication with a central controller 420, e.g., using any wired or wireless technology (e.g., RFID, NFC, Bluetooth, WiFi, coded light, Ultra-sonic, etc.). Central controller 420 may be any device or plurality of devices configured to act as a lighting system controller, including but not limited to a smart phone, tablet computer, lighting system bridge, desktop, laptop, set top box, and so forth. In such an embodiment, rather than each lighting unit 400 being programmed with or calculating its pause time interval, each lighting unit 400 may simply wait to transition its respective light sources between lighting states until it receives a signal, or pulse, from central controller 420. In some embodiments, central controller 420 may, upon receiving a signal from a light switch 416 or other trigger, send out a number of periodic data pulses. Each lighting unit 400 may be configured to transition its respective light sources between lighting states upon receiving a predetermined number of the data pulses (e.g., corresponding to its sequence in the sequence of lighting units).

A plurality of lighting units may be configured to cooperatively transition their respective light sources between lighting states in other manners as well. For instance, in some embodiments, each lamp may be programmed, or a central controller (e.g., 420) may be programmed to send out signals, such that the lamps turn on or off in a manner that gives off a dynamic lighting effect (e.g., to accompany a song or jingle). In some embodiments, the lighting units may be equipped with speakers and may emit musical tones or other sounds dependent on their position in a sequence. The resulting sounds may resemble various things, such as a magical wand, or subtle taps.

In some embodiments, the sequence in which a plurality of lighting units transition their respective light sources between lighting states may vary depending on how and/or where the sequence was triggered. For example, and referring to FIG. 5, a plurality of lighting units 500*a-h* is depicted lining a pathway 530. Presence sensors 532, 534, which may be various types of presence and/or proximity sensors such as passive infrared sensors or pressure wave detectors, are positioned at each end of pathway 530. The sequence in which the plurality of lighting units 500 are transitioned between lighting states may depend on which presence sensor, 532 or 534, detects a person's presence. In various embodiments, the lighting unit 500 closest to the presence detector that detected the person may be the first to transition one or more of its respective lights sources between lighting states. The next lighting unit 500 in line may wait its pause time interval, and then transition its respective one or more lighting sources between lighting states, and so on, until the last lighting unit 500 at the opposite end of the path 530 has transitioned its respective light sources between lighting states.

As noted above, a lighting unit may be made aware of the previous lighting unit's illumination in various ways, such as by detecting the previous lighting unit's emitted light (e.g., using one or more light sensors 104) or by receiving a signal from the previous lighting unit (e.g., via wireless techniques such as coded light, Bluetooth or WiFi, or a wired connection). Additionally or alternatively, the next lighting unit 500 may receive a signal from a central controller (not depicted in FIG. 5, e.g., 420 in FIG. 4).

Figure 5:
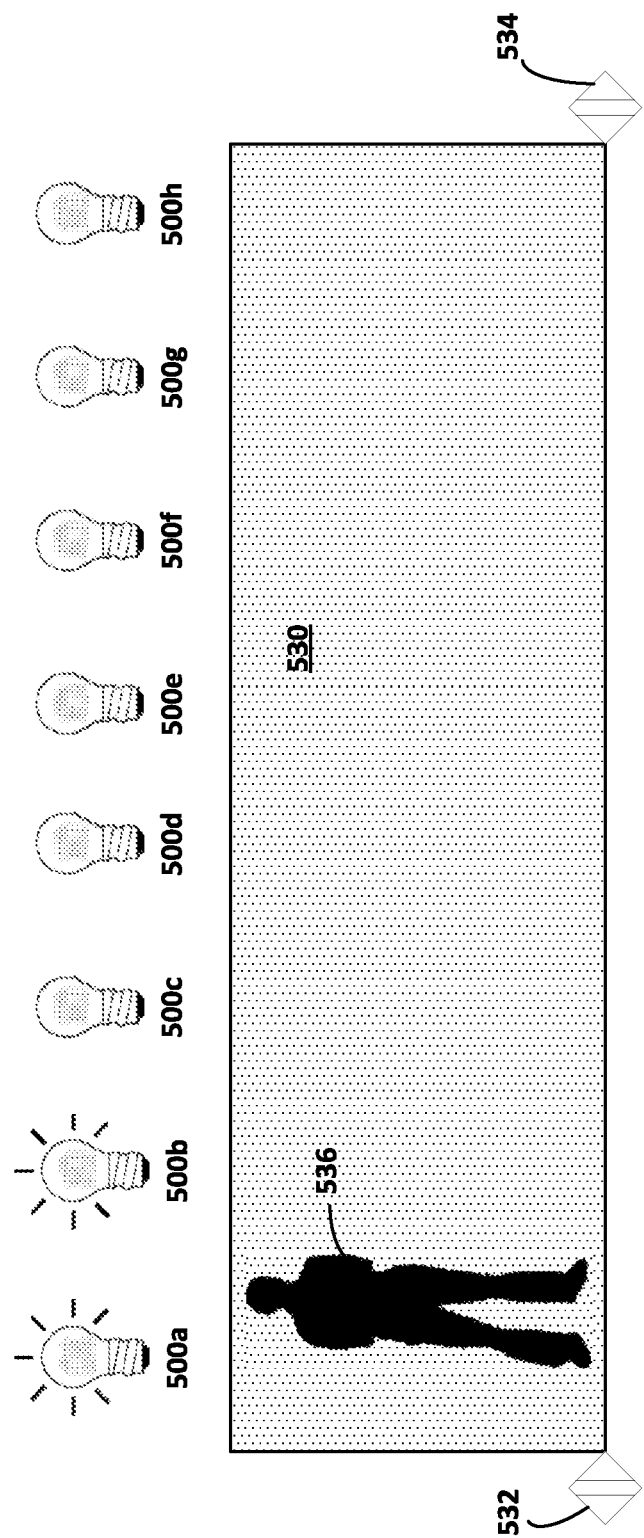
FIG. 5 schematically depicts an example group of lights installed along a path, in accordance with various embodiments.

In FIG. 5, presence detector 532 detected a person 536 passing by. First lighting unit 500*a* energized its respective light sources first, followed by second lighting unit 500*b* (after a pause time interval). Third lighting unit 500*c* will be the next to energize its respective light sources (again, after a pause timer interval), followed by fourth lighting unit 500*d*, and so on. Similar techniques could be applied if, instead of presence sensors 532 and 534, light switches or other actuators were installed at each end of path 530.

In some embodiments, a sequence of lighting units may de-energize their respective light sources in a similar fashion as they energize their respective light sources. For instance, first lighting unit 500*a* closest to entry presence detector 532 may de-energize its respective light sources first, followed by the next lighting unit 500*b* (after a pause time interval), and so on, until all lighting units are extinguished. In some embodiments, each lighting unit 500 may be configured to remain energized for a predetermined time interval, which may be selected to be long enough to ensure that even a relatively slow person has time to pass by. In various embodiments, the time interval that lighting units 500 remain energized may be selected so that they all remain illuminated until person 536 has likely passed, or the time interval may be selected to approximate the person's walking speed, so that only those lighting units near person 536 are energized. Since each lighting unit 500 energized its respective light sources a pause time interval after the preceding lighting unit, each lighting unit 500 may remain energized for a pause time interval after the preceding lighting unit 500 has de-energized. Although two presence detectors are depicted in FIG. 5, this is not meant to be limiting. In other embodiments, more or less presence detectors or other actuators could be included.

The sequence in which a plurality of lighting units are turned on or off in response to a triggering event may vary in other ways. In some embodiments, the plurality of lighting units transition their respective light source between lighting states at random, e.g., to create a cacophony of light as a user enters or leaves an environment. In some embodiments, a lighting unit may be equipped with location sensing capability, e.g., via GPS or other similar means. In such case, in addition to or instead of determining a pause time interval based on its position in a sequence, a lighting unit may determine its pause time interval based on its location. For instance, in FIG. 5, the last lighting unit 500*h* may be equipped with GPS and may determine that it is a particular distance from presence detector 532 that detected person 536. Last lighting unit 500*h* may approximate how long it will take for person 536 to arrive at or near last lighting unit 536, e.g., based on the particular distance and other data such as average human walking or running speeds or a speed of user 536 detected by presence sensor 532.

Figure 6:
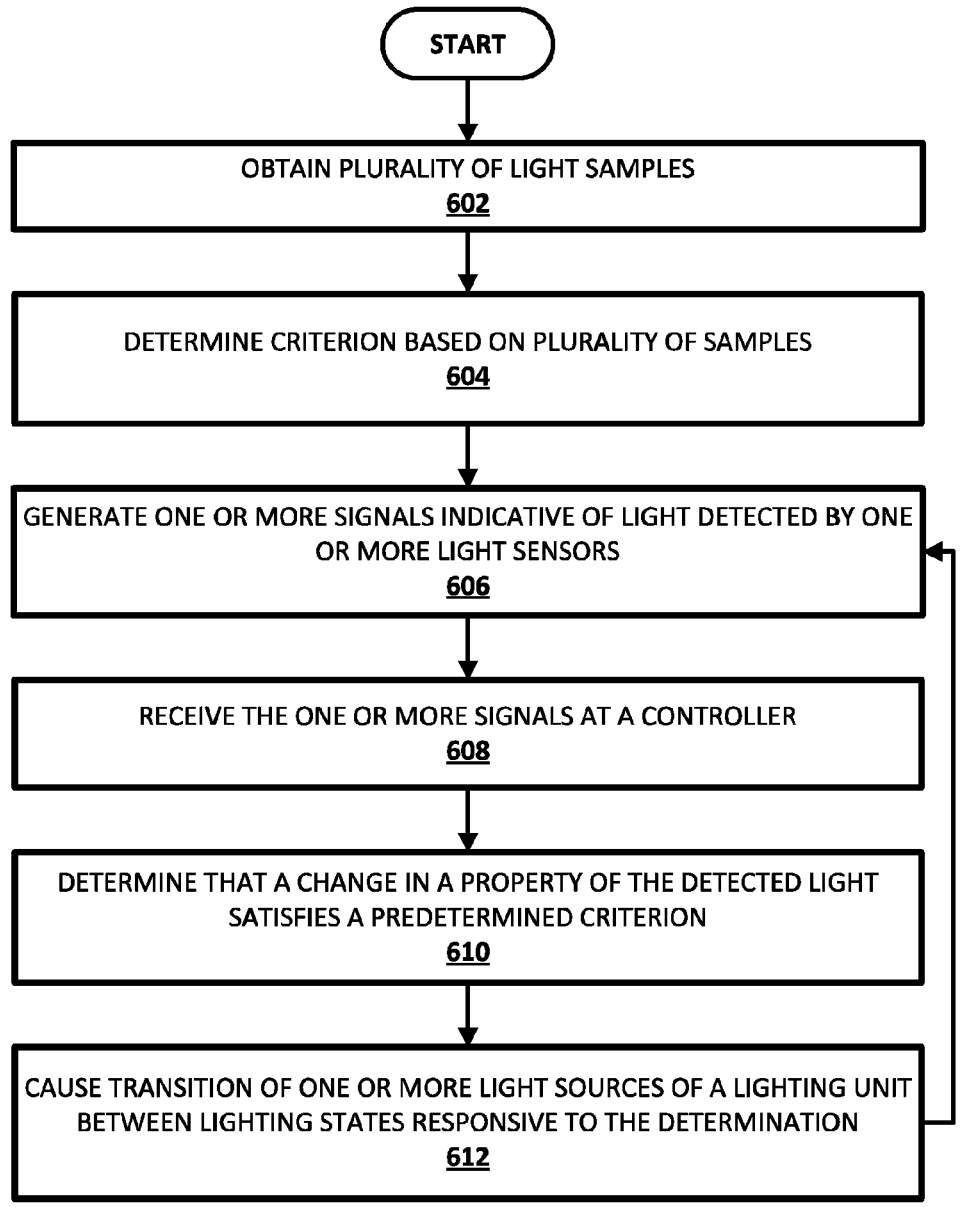
FIG. 6 depicts a method of controlling a lighting unit, in accordance with various embodiments.

FIG. 6 depicts an example method 600 that may be implemented by a controller, such as controller 102 of a lighting unit 100 or a controller 202 of an adaptor 217, as well as by other components (e.g., one or more light sensors 104), in accordance with various embodiments. While the operations of FIG. 6 are depicted in a particular order, this is not meant to be limiting. One or more operations may be performed in a different order, omitted or added without departing from the present disclosure.

At block 602, a plurality of lighting samples may be obtained, e.g., by one or more light sensors 104, at various sampling rates to cover various time intervals. For instance, samples may be obtained for five seconds in order to ensure that the followed light source has sufficient time to fully illuminate (or de-illuminate). At block 604, the criterion on which the controller may later base its decision to transition one or more light sources between lighting states may be determined, e.g., based on the samples obtained at block 602. For instance, interpolation may be performed using the samples obtained at block 602 to estimate a function, and then a derivative function of the estimated function may be calculated. The derivative function, which in some embodiments may represent a minimum rate of change, may be the criterion (subsequently referred to as a "predetermined criterion") on which a controller bases its decision to transition light sources of a lighting unit between lighting states.

At block 606, one or more light sensors 104 may then generate one or more signals indicative of detected light. At block 608, those one or more signals may be received, e.g., by controller 102 or 202. At block 610, it may be determined, e.g., by controller 102 or 202, that a change in a property (e.g., intensity or brightness) of the detected light satisfies the criterion that was predetermined at block 604. For example, controller 102 or 202 may, based on interpolating a plurality of samples carried in signals generated by one or more light sensors 104 at block 606, estimate a function. A derivative of that estimated function may then be calculated and compared to the derivative function (e.g., representing a minimum rate of change) calculated at block 604.

At block 612, controller 102 may transition, or controller 202 may cause transition of, one or more light sources (e.g., 106a-m) between lighting states responsive to the determination of block 610. For example, one or more light sources 106 may be energized or de-energized. Additionally or alternatively, another property of light emitted by one or more light sources 106 may be altered. Method 600 may then proceed back to block 606.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

It should also be understood that, unless clearly indicated to the contrary, in any methods claimed herein that include more than one step or act, the order of the steps or acts of the method is not necessarily limited to the order in which the steps or acts of the method are recited.

Reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to.

The invention claimed is:

1. A lighting unit comprising:
one or more light sources;
one or more light sensors; and
a controller coupled with the one or more light sources and the one or more light sensors, the controller configured to:

receive, from the one or more light sensors, one or more signals indicative of light detected by the one or more light sensors;
cause the one or more light sensors to obtain a plurality of samples of light emitted by an outside light source as it transitions between a first state and a second state;
calculate a threshold rate of change of the light emitted by the outside light source based on the plurality of samples; and
transition the one or more light sources between first and second lighting states responsive to a determination, based on the one or more signals, that a change in a property of the light detected by the one or more light sensors satisfies the threshold rate of change of the property of the detected light,
wherein the one or more signals comprises a plurality of samples of light detected by the one or more light sensors, and the change in the property of the detected light comprises a rate of change of the property of the detected light calculated based on the plurality of samples.

2. The lighting unit of claim 1, wherein the controller is further configured to determine a numerical approximation of a derivative of the plurality of samples to determine the threshold rate of change.

3. The lighting unit of claim 1, wherein the first and second lighting states comprise energized and not energized.

4. The lighting unit of claim 1, further comprising one or more optical elements to divert the light towards at least one of the one or more light sensors.

5. The lighting unit of claim 1, wherein at least one of the one or more light sensors is adjustable to point in a plurality of directions.

6. A lighting unit comprising:
one or more light sources;
one or more light sensors; and
a controller coupled with the one or more light sources and the one or more light sensors, the controller configured to:
receive, from the one or more light sensors, one or more signals indicative of light detected by the one or more light sensors; and
transition the one or more light sources between first and second lighting states responsive to a determination, based on the one or more signals, that a change in a property of the light detected by the one or more light sensors satisfies a threshold rate of change of the property of the detected light,
wherein the one or more signals comprises a plurality of samples of light detected by the one or more light sensors, and the change in the property of the detected light comprises a rate of change of the property of the detected light calculated based on the plurality of samples,
wherein the controller is further configured to transition the one or more light sources between the first and second lighting states responsive to a further determination, based on the one or more signals, that the change in the property of the light detected by the one or more light sensors follows a spatial pattern.

7. The lighting unit of claim 1, wherein the controller is further configured to pause for a time interval between the determination and transitioning the one or more light sources between the first and second lighting states.

8. The lighting unit of claim 7, wherein the controller is further configured to receive a commission that assigns the lighting unit a position in a sequence of lighting units.

9. The lighting unit of claim 8, wherein the controller is further configured to calculate the time interval based on the lighting position of the lighting unit in the sequence.

10. A method, comprising:
generating, by one or more light sensors, one or more signals indicative of light detected by the one or more light sensors;
receiving, by a controller from the one or more light sensors, the one or more signals; and
causing transition, by the controller, of one or more light sources of a lighting unit between first and second lighting states responsive to a determination based on the one or more signals, that a change in a property of the light detected by the light sensor satisfies a predetermined criterion,
wherein the predetermined criterion comprises a minimum rate of change, the one or more signals comprises a plurality of samples of light detected by the one or more light sensors, and the change in the property of the detected light comprises a rate of change of the property of the detected light calculated based on the plurality of samples,
wherein the predetermined criterion further comprises a spatial pattern, and the method further comprises causing transition, by the lighting unit controller, of the one or more light sources between the first and second lighting states responsive to a further determination, based on the one or more signals, that the change in the property of the light detected by the one or more light sensors follows the spatial pattern.

11. A method, comprising:
generating, by one or more light sensors, one or more signals indicative of light detected by the one or more light sensors;
receiving, by a controller from the one or more light sensors, the one or more signals;
obtaining, by the one or more light sensors, a plurality of samples of light emitted by an outside light source as it transitions between a first state and a second state;
calculating, by the controller, a threshold rate of change of the light emitted by the outside light source based on the plurality of samples; and
causing transition, by the controller, of one or more light sources of a lighting unit between first and second lighting states responsive to a determination based on the one or more signals, that a change in a property of the light detected by the light sensor satisfies a predetermined criterion,
wherein the predetermined criterion comprises the minimum rate of change, the one or more signals comprises a plurality of samples of light detected by the one or more light sensors, and the change in the property of the detected light comprises a rate of change of the property of the detected light calculated based on the plurality of samples.

12. The method claim 11, further comprising determining a numerical approximation of a derivative of the plurality of samples to determine the threshold rate of change.

13. The method unit of claim 10, wherein the first and second lighting states comprise energized and not energized.

14. A lighting unit; comprising:
one or more light sources;
one or more light sensors; and
a controller coupled with the one or more light sources and the one or more light sensors, the controller configured to:

determine a time interval based on a designated position of the lighting unit in a sequence of lighting units;

receive, from the one or more light sensors, one or more signals indicative of light detected by the one or more light sensors;

determine, based on the one or more signals, that a change in a property of the light sensed by the one or more light sensors satisfies a threshold rate of change of the property of the detected light; and responsive to the determination and after a pause for the time interval, transition the one or more light sources between first and second lighting states, wherein the one or more signals comprises a plurality of samples of light detected by the one or more light sensors, and the change in the property of the sensed light comprises a rate of change of the property of the detected light calculated based on the plurality of samples.

15. A lighting unit adaptor comprising:

one or more light sensors; and a controller coupled with the one or more light sensors, the controller configured to:

receive, from the one or more light sensors, one or more signals indicative of light detected by the one or more light sensors; and cause transition of one or more light sources of a lighting unit between first and second lighting states responsive to a determination, based on the one or more signals, that a change in a property of the light detected by the one or more light sensors satisfies a threshold rate of change of the property of the detected light, wherein the one or more signals comprises a plurality of samples of light detected by the one or more light sensors, and the change in the property of the detected light comprises a rate of change of the property of the detected light calculated based on the plurality of samples, wherein the controller is further configured to pause for a time interval between the determination and transitioning the one or more light sources between the first and second lighting states.

* * * * *